Patented Dec. 1, 1942

2,303,414

UNITED STATES PATENT OFFICE 2,303,414

PROCESS AND REAGENT FOR RESOLVING EMULSIONS

Truman B. Wayne, Houston, Tex.

No Drawing. Application July 29, 1938, Serial No. 222,060

16 Claims. (Cl. 252—341)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent which is water-wettable, interfacial and surface-active in order to enable its employment as a demulsifier or for such uses where water-wettable properties and characteristics are necessary or desirable.

Further objects will appear from the following in which the reagents and the process for their employment will be described as related to their employment for the treating of petroleum emulsions.

The present process comprises subjecting a petroleum emulsion of the water and oil type to the action of small proportions of a complex, organic condensation product prepared from an aliphatic amine, an aldehyde, and an aliphatic body possessing an acidic function, selected from the group comprising higher fatty acids, rosin and resin acids, naphthenic acids, and similar amine-reactive bodies having eight or more carbon atoms in their hydrocarbon structure. As will hereinafter be explained, these three classes of reacting substances are utilized in the preparation of my new demulsifying agents, and various combinations and orders of reacting these various chemicals are contemplated, as will be seen from the following discussion.

My prior patent, No. 1,937,259, dated November 28, 1933, described demulsifiers of the modified aromatic amine-aldehyde type. This patent disclosed condensation products of aromatic amines, aldehydes, and detergent-forming bodies. Such condensation products are also disclosed as being further condensed with alkylamines to form more complex derivatives.

Another prior patent, No. 1,919,871, dated July 25, 1933, and later reissued as Reissue Patent No. 20,717, dated May 3, 1938, described, among others, demulsifiers of the modified phenol-aldehyde type. This patent disclosed phenolic bodies such as the mono, di, and tri-hydric phenols, and other closely related substances, condensed with aldehydes and detergent-forming bodies. Such condensation products are also disclosed as being further condensed with alkylamines to form more complex derivatives.

It is stated in both of the above mentioned patents that, in addition to the unaltered detergent-forming acids, derivatives of detergent-forming materials, including esters, amides, and other similar derivatives, are suitable examples of detergent-forming bodies.

My prior patent, No. 1,860,563, disclosed various polyamine derivatives of detergent-forming acids, including modified detergent-forming acids. Owing to the plurality of amino groups or their residues, the reaction products of these polyamines with detergent-forming bodies prepared semi-resinous products of considerable value in the resolution of petroleum emulsions.

Later, my copending application, Serial No. 222,059, filed July 29, 1938, now Patent 2,225,189, dated December 17, 1940, described condensation products of the derivatives of the polyamines with polycarboxy acids of the type exemplified by phthalic, maleic, and the like. These more complex substances have many of the properties of a modified synthetic resin owing to the plurality of reactive hydroxyl, amino, imino, amido, imido, and carboxyl groups.

The present application is a continuation of the general subject matter of the above mentioned patents and applications, which broadly disclosed processes using reagents of the modified synthetic resin type as petroleum demulsifiers. Specifically, it discloses a new series of petroleum demulsifiers of the modified synthetic resin type prepared from an aliphatic amine, preferably a polyalkyl polyamine, an aldehyde, and a detergent-forming aliphatic body possessing an acidic amine-reactive group. The present invention is based on the discovery that reaction products of the type disclosed in my prior patent, No. 1,860,563, dated May 31, 1932, when treated with aldehydes, yield valuable and improved petroleum demulsifiers. The demulsifiers prepared according to the present invention differ considerably in their solubility relationships from the demulsifiers described in my prior patent, No. 1,937,259, dated November 28, 1933, and hence constitute an improvement in the treatment of certain emulsions over the demulsifiers previously disclosed in the above mentioned patent which disclosed the use of a sulfonated aromatic amine as the amino body used in their preparation. In fact, when using alkylamines, as is disclosed in the present invention, sulfonation can usually be dispensed with, although there are instances where this may be inadvisable.

In the preparation of my new demulsifiers, three classes of chemical bodies may be used.

They are: (1) An alkylamine having at least one

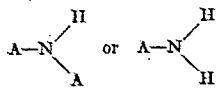

group, preferably derived from a polyalkylene polyamine. (2) An aldehyde from the aliphatic, carbocyclic or heterocyclic series, which may be of either saturated or unsaturated nature. (3) A higher acidic amine-reactive aliphatic body or its polycarboxy acid derivative, as hereinafter described.

Among suitable amines are primary and secondary monoalkyl amines such as the mono- and di-ethyl, propyl, butyl, amyl, hexyl, octyl, and decyl amines which may be hydroxy or non-hydroxy in character. While these monoalkyl amines are satisfactory for the reason that they form more complex amines when treated with aldehydes, I prefer that the amine be a polyamine such as the alkylene-polyamines or the poly-alkylene polyamines. Among suitable examples of these classes of amines are ethylene diamine, diethylene triamine, triethylene tetramine, tetraethylene pentamine, and other similar amines of analogous structure. Substituted derivatives of these amines are suitable so long as they have at least one reactive amino or imino group, but preferably should have more than one of these groups. Hydroxylated derivatives of any of the above amines prepared by the substitution of hydroxy-alkyl or hydroxy-aralkyl groups for the hydrogen atoms attached to an amino or imino nitrogen, are entirely suitable provided they have at least one remaining reactive amino or imino group.

Suitable aldehydes may be selected from a wide range of aldehydic substances. Aldehydes of low molecular weight such as formaldehyde, acetaldehyde, or proprionaldehyde, may be used, and also other aldehydes of this same homologous series ranging up to aldehydes of high molecular weight prepared from higher fatty acids. An example of such aldehydes is stearylaldehyde. Other aldehydes of the carbocyclic or heterocyclic series may be used. The presence of an aldehydic group capable of reacting with the NH group of a secondary amine or amide, or the NH₂ group of a primary amine is the governing factor in determining the suitability of any aldehyde. As far as I have been able to determine, any aldehyde, whether saturated or unsaturated, aliphatic or aromatic, is entirely suitable, although, of course, certain obvious differences will exist in the final condensation product, which, of course, is partially caused by differences in the molecular weight, structure, solubility, etc., of the aldehyde used in the condensation reactions. Polymeric forms of the aldehydes are likewise suitable. For instance, instead of formaldehyde, $CH_2O$, a polymeric form such as $(CH_2O)_3$ may be used.

Suitable detergent-forming acids may be selected from the group comprising saturated and unsaturated fatty acids having eight or more carbon atoms in their fatty chains, rosin and resin acids, naphthenic acids and the like. Modification products of detergent-forming acids such as the sulfonated, halogenated, oxidized, and internally esterified fatty bodies are suitable modifying agents in the preparation of my demulsifiers. They must, of course, have an acidic group or groups capable of reacting with the amino body through its amino group or residue or through a hydroxyl group present on the amino body. Such acidic groups comprise, of course, carboxyl and/or sulfonic groups or their reactive equivalents.

Fatty alcohols of high molecular weight such as oleyl or stearyl alcohol are also suitable provided they are sulfonated or chlorinated to provide an acidic group capable of reacting with an amino, imino, or hydroxyl group. The term "detergent-forming body" as herein used is intended to cover any reactive aliphatic body of high molecular weight capable of attaching itself to the amino body.

In order to illustrate specifically the new type of complex condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their substituted derivatives, and other proportions, may be employed without departing from the spirit of the invention or the scope of the appended claims.

*Example I*

300 parts of ricinoleic acid, 150 parts of sulfur dioxide extract derived from kerosene distillates, and 125 parts of technical diethylene triamine, are mixed and warmed to form the amine soap. To this is added 100 parts of aqueous 40% formaldehyde solution while stirring and cooling. The mass is then heated under reflux until the odor of formaldehyde disappears. The separation of the oily upper layer can be facilitated by dissolving sodium chloride in the water layer which separates below.

*Example II*

The condensation product from Example I can be heated to dehydrate the amine soap linkage and further polymerize the molecule. This can be accomplished by heating at 125°–200° C., preferably in the presence of an acid catalyst.

*Example III*

400 grams of oleyl-dibutylethylene diamine, prepared as described in my prior Patent No. 1,860,563, dated May 31, 1932, is heated with 100 parts of 40% formaldehyde under reflux for six hours, or until the odor of formaldehyde disappears. 200 grams of sulfur dioxide extract are preferably used as a solvent. The temperature is raised to 150° C., and distillation of water is continued until the oily layer is practically anhydrous.

*Example IV*

75 parts of butyraldehyde and 150 parts of a mixture of polyalkylene polyamines derived from the synthesis of ethylene diamine, and consisting of a mixture of diethylene triamine, triethylene tetramine, tetraethylene pentamine, and possibly their higher homologues, are mixed and heated to insure complete reaction to a complex body. To the reaction product is added 300 parts of ricinoleic acid or other hydroxylated acid, and 150 parts of sulfur dioxide extract. The mass is heated until the fatty amide is formed.

*Example V*

To a molecular equivalent of the product from Example IV is added 1480 parts of a triricinolein triphthalic acid ester prepared by heating 936 parts of castor oil and 444 parts of phthalic anhydride at 150° C. for six hours. The mass is heated at 150°–200° C. for two to six hours to condense to a homogeneous product.

The free carboxyls of the triricinolein triphthalic acid ester unite with the polyamine-aldehyde body by esterification of hydroxyl groups, or by acylating the amino residues through replacement of hydrogen atoms attached to the amino nitrogen atoms.

Example VI 400 parts of sulfo ricinoleic acid and 200 parts of sulfur dioxide extract are added to a mixture of 75 parts of butyraldehyde and 150 parts of a mixture of crude polyalkylene polyamines derived from the preparation of ethylene diamine, and the mass is heated under reflux at 75°–150° C. until the odor of butyraldehyde has disappeared. Any residual sulfonic acidity is neutralized with ammonia or an alkyl amine.

Example VII

The simpler mono-amines likewise form complexes when reacted with aldehydes and a fatty body. For instance, 600 parts of ricinoleic acid, 300 parts of sulfur dioxide extract, and 150 parts of primary isobutyl amine are heated at 150°–200° C. in the presence of an acid catalyst to form two molecular equivalents of the ricinoleic acid amide of isobutyl amine. To this is added 100 parts of 40% formaldehyde and the mixture is heated slowly to the point where some refluxing begins. It is maintained at this temperature for three hours, after which the water and excess of formaldehyde is distilled off.

The above examples are only a few of the many products which may be prepared according to the principles disclosed in the foregoing discussion. While sulfonation is preferably done on one or more of the reacting constituents or ingredients prior to formation of the final, complex, resinous or semi-resinous product, it should be readily understood that sulfonation may be applied to the final product.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include OSO₃H and SO₃H groups, and their neutralization products.

Where reference is made to "detergent-forming acids," it is understood to include aliphatic acids having eight or more carbon atoms in their hydrocarbon chain, rosin and resin acids, naphthenic acids, and the like.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in the proportion of one part of treating agent to from 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions, as will be apparent.

I claim:

1. A petroleum demulsifying composition capable of being dispersed as a water-wettable, surface-active and interfacial colloid in the petroleum emulsion which comprises as a component the condensation product of an aliphatic amine, an aldehyde, and an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

2. A petroleum demulsifying composition capable of being dispersed as a water-wettable, surface-active and interfacial colloid in the petroleum emulsion which comprises as a component the condensation product of an aliphatic amine, an aldehyde, and a reactive derivative of an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

3. A petroleum demulsifying composition which comprises as a component the condensation product of an aliphatic polyamine, an aldehyde selected from the group consisting of aliphatic aldehydes, carbocyclic aldehydes and heterocyclic aldehydes, and a modified aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

4. A petroleum demulsifying composition which comprises as a component the condensation product of a polyalkylene polyamine, an aldehyde selected from the group consisting of aliphatic aldehydes, carbocyclic aldehydes and heterocyclic aldehydes, and an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

5. A petroleum demusifying composition which comprises as a component the condensation product of a polyalkylene polyamine, an aldehyde selected from the group consisting of aliphatic aldehydes, carbocyclic aldehydes and heterocyclic aldehydes, and a reactive derivative of an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

6. A petroleum demulsifying composition which comprises as a component the condensation product of a polyalkylene polyamine, an aldehyde selected from the group consisting of aliphatic aldehydes, carbocyclic aldehydes and heterocyclic aldehydes, and a modified aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

7. A petroleum demulsifying composition which comprises as a component the condensation product of an aliphatic amine, an aldehyde selected from the group consisting of aliphatic aldehydes, carbocyclic aldehydes and heterocyclic aldehydes, and an acid ester derived from a hydroxylated detergent-forming body and a polycarboxy acid.

8. In the process of breaking petroleum emulsions, the step of adding thereto a demulsifying composition capable of being dispersed as a water-wettable surface-active and interfacial colloid in the petroleum emulsion which comprises as a component the condensation product of an aliphatic amine, an aldehyde, and an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

9. In the process of breaking petroleum emulsions, the step of adding thereto a demulsifying composition capable of being dispersed as a water-wettable surface-active and interfacial colloid in the petroleum emulsion which comprises as a component the condensation product of an aliphatic amine, an aldehyde, and a reactive derivative of an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

10. In the process of breaking petroleum emulsions, the step of adding thereto a demulsifying composition which comprises as a component the condensation product of an aliphatic polyamine, an aldehyde selected from the group consisting of aliphatic aldehydes, carbocyclic aldehydes and heterocyclic aldehydes, and a modified aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

11. In the process of breaking petroleum emulsions, the step of adding thereto a demulsifying composition which comprises as a component the condensation product of a polyalkylene polyamine, an aldehyde selected from the group consisting of aliphatic aldehydes, carbocyclic aldehydes and heterocyclic aldehydes, and an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

12. In the process of breaking petroleum emulsions, the step of adding thereto a demulsifying composition which comprises as a component the condensation product of a polyalkylene polyamine, an aldehyde selected from the group consisting of aliphatic aldehydes, carbocyclic aldehydes and heterocyclic aldehydes, and a reactive derivative of an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

13. In the process of breaking petroleum emulsions, the step of adding thereto a demulsifying composition which comprises as a component the condensation product of a polyalkylene polyamine, an aldehyde selected from the group consisting of aliphatic aldehydes, carbocyclic aldehydes and heterocyclic aldehydes, and a modified aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

14. In the process of breaking petroleum emulsions, the step of adding thereto a demulsifying composition which comprises as a component the condensation product of an aliphatic amine, an aldehyde selected from the group consisting of aliphatic aldehydes, carbocyclic aldehydes and heterocyclic aldehydes, and an acid ester derived from a hydroxylated detergent-forming body and a polycarboxy acid.

15. A petroleum demulsifying composition of the character described, comprising, the water-wettable, interfacial and surface-active condensation product of an aliphatic amine, an aldehyde, and an aliphatic body possessing an acidic function, selected from the group consisting of, first, the higher fatty acids; second, rosin and resin acids; third, naphthenic acids and fourth, similar detergent-forming amine-reactive aliphatic bodies including sulfonated, halogenated, oxidized and internally esterified detergent-forming bodies having at least eight carbon atoms in the hydrocarbon structure.

16. A composition of the character described, comprising, the water-wettable, interfacial and surface-active condensation product of an aliphatic amine, an aldehyde selected from the group consisting of aliphatic aldehydes, carbocyclic aldehydes and heterocyclic aldehydes, and an acid ester derived from a hydroxylated detergent-forming body and a polycarboxy acid.

TRUMAN B. WAYNE.